United States Patent [19]

Horne

[11] 4,342,929
[45] Aug. 3, 1982

[54] ELECTRIC MOTOR WHEREIN LOW TEMPERATURE POLYMERIC HOUSING SUPPORTS HEAT DISSIPATING PORTIONS THROUGH HEAT RESISTING POLYMERIC BRIDGING MEMBER

[75] Inventor: David Horne, Staines, England
[73] Assignee: Black & Decker Inc., Newark, Del.
[21] Appl. No.: 168,378
[22] Filed: Jul. 10, 1980
[30] Foreign Application Priority Data
   Jul. 13, 1979 [GB] United Kingdom ............... 7924527
[51] Int. Cl.³ ........................................... H02K 1/04
[52] U.S. Cl. ......................................... 310/43; 310/50
[58] Field of Search ........................... 310/43, 47, 50

[56] References Cited
U.S. PATENT DOCUMENTS 3,196,297  7/1965  Kaeding ............................. 310/43
3,344,291  9/1967  Pratt ................................. 310/43
3,688,137  8/1972  Filhol ............................... 310/43

Primary Examiner—Donovan F. Duggan
Attorney, Agent, or Firm—Walter Ottesen; Harold Weinstein; Edward D. Murphy

[57] ABSTRACT

In a portable tool, the electric motor is mounted within the tool and motor housing, of heat softening polymeric material, by spacer members of heat resistant polymeric material.

11 Claims, 16 Drawing Figures

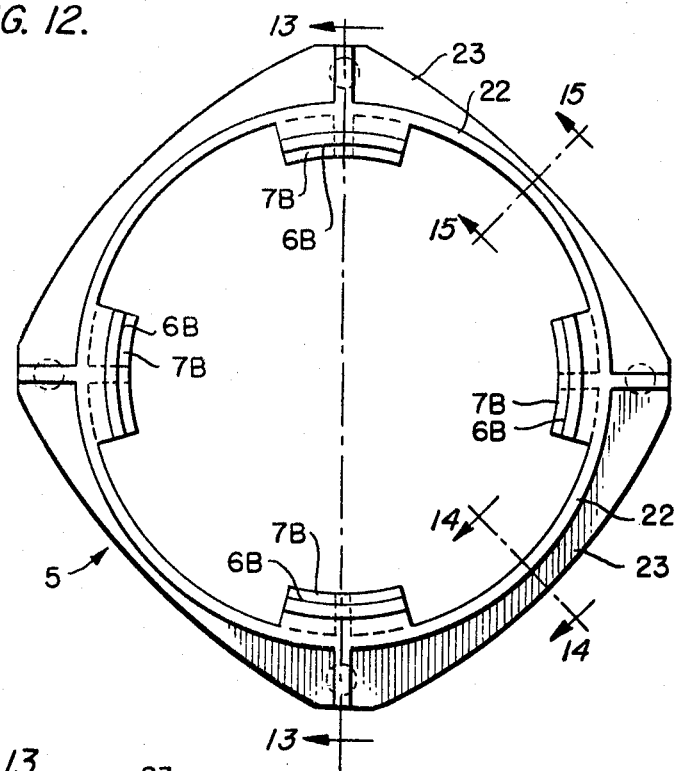
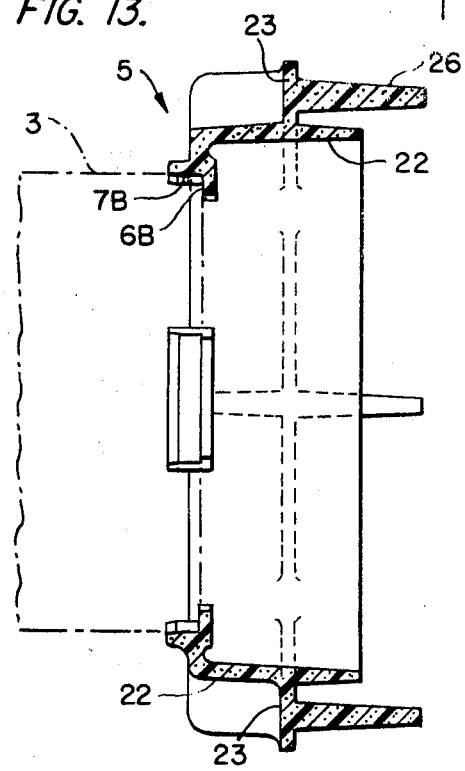

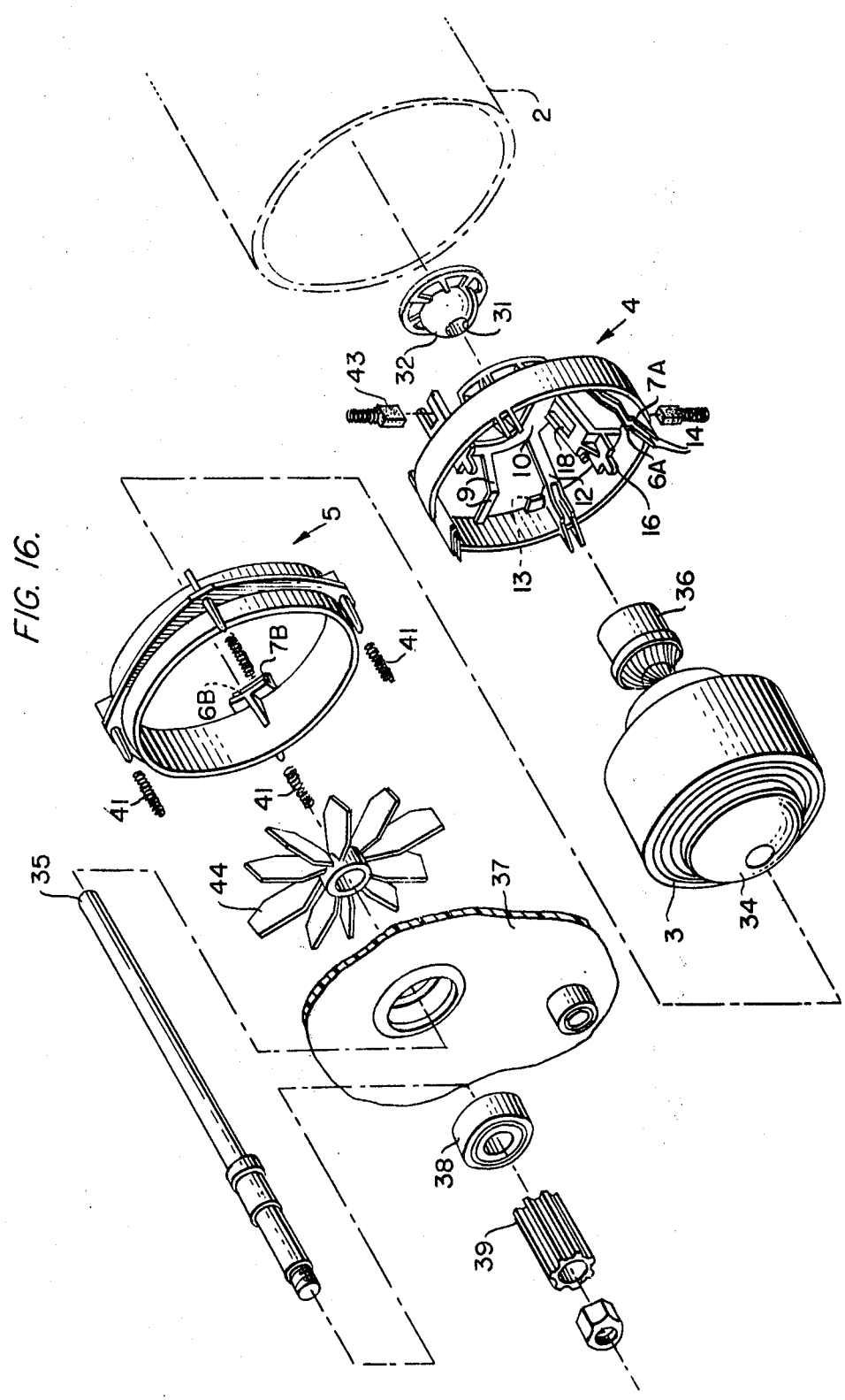

ELECTRIC MOTOR WHEREIN LOW TEMPERATURE POLYMERIC HOUSING SUPPORTS HEAT DISSIPATING PORTIONS THROUGH HEAT RESISTING POLYMERIC BRIDGING MEMBER

RELATED APPLICATIONS

This application is not patentably related to any other application in the United States. It is related to the provisional application filed in Great Britain, on which the claim for priority rights is based.

SUMMARY

This invention relates to an electric motor assembly in which the motor housing is made of an economical polymeric material and the heat emitting portions within the motor housing are supported from the motor housing by means of minimal sized bridging members made of a more costly heat-resisting polymer material. The invention is particularly useful in electric powered portable tools.

In many power tools the stator assembly of the electric motor, i.e., that part comprising the field windings and the laminated stator core, is mounted directly in a housing made of a heat resisting polymeric material, such as glass-filled nylon. The housing not only provides support for the stator assembly but also acts as an electrically-insulating protective cover round the assembly. The motor housing must be able to withstand the motor working temperature. This limits the range of suitable polymeric material, and suitable ones are expensive.

It has also been proposed to mount the motor, normally as a complete unit, in a polymeric material supporting frame which is then enclosed in a motor housing. In this case the supporting frame supports both the electric motor and the motor housing. While the motor housing can be made of a less expensive polymeric material, the supporting frame will be more expensive, partly because it must be heat resisting and partly because its sections must be large, in order to properly support the motor housing against the blows encountered during usage.

It is an object of the present invention to provide an electric motor assembly where the motor housing is made of a more economical polymeric material, and is made with sections heavy enough to support, within it, the heat-emitting electric motor. The connection between the inexpensive housing and said heat-emitting electric motor is by way of bridging members using minimal amounts of more expensive heat resistant polymeric material.

Where the housing is made integral with a larger moulding which fulfills other functions with no high temperature requirements, for example handle and guards, etc., the cost advantage of using a relatively inexpensive material is significantly increased.

According to the present invention, an electric motor assembly comprises a stator assembly including field windings mounted upon a laminated core. At each end of the stator assembly, an individual spacing member of a polymeric material, able to withstand the motor working temperature, is located. A motor housing, around the stator assembly, locates and supports the members.

The spacing members constitute a thermal conduction path of very low thermal conductivity between the stator assembly and the housing, so that the housing does not have to withstand the full working temperature of the motor.

A spacing member may have an extension, which acts as a heat shield, between the end of the stator winding and the housing.

Each spacing member may have an end surface by means of which the spacing member is secured to the laminated core. Locating surfaces may be formed on both core and spacing members to facilitate the correct positioning of the latter with respect to former.

In one embodiment of the invention, the spacing members are made of glass filled nylon while the housing is made of the polymeric material commonly designated ABS.

One of the spacing members may be formed with an extension that bridges the spacing member and provides support for an armature bearing and for a commutator brush holder. The other spacing member may be formed with a baffle to prevent recirculation round the fan of the output of a motor cooling fan.

The interior of the housing has locating surfaces which position the spacing members, and thus the stator assembly, inside the casing and resilient means, for example springs, may be provided for urging the spacing members, and thus the stator assembly, against the locating surfaces and for retaining it in contact therewith.

THE DRAWINGS

FIGS. 3, 4 and 5 are fragmentary views of different details of the electric motor, showing how the parts fit together;

FIG. 8 is an end view taken from the right side in FIG. 7 or the opposite side that FIG. 6 is taken from;

FIG. 9 is a fragmentary view, taken from the upper left of FIG. 6, at a 45 degree angle to the horizontal;

FIG. 10 is a section on line 10—10 in FIG. 6;

FIG. 11 is a section on line 11—11 in FIG. 6;

FIG. 12 is an end view of a second spacing member, also made of a heat resistant polymeric material, and used at the non-commutator end of the electric motor;

FIG. 13 is a section taken on the line 13—13 of FIG. 12;

FIG. 14 is a section taken on the line 14—14 of FIG. 12;

FIG. 15 is a section taken on the line 15—15 of FIG. 12; and

FIG. 16 is a fragmentary exploded perspective view of the electric motor of the invention, corresponding to what is depicted in FIG. 1.

DETAILED DESCRIPTION

By way of example only an electric motor assembly for a chain saw, embodying the invention, will now be described in greater detail with reference to the accompanying drawings.

Integral with the main housing 1 of the chain saw is a motor housing 2 housing an electric motor that drives the saw chain (not shown) of the chain saw. A cover 2A closes off the right end of the housing 2 in FIG. 1.

Figure 5:
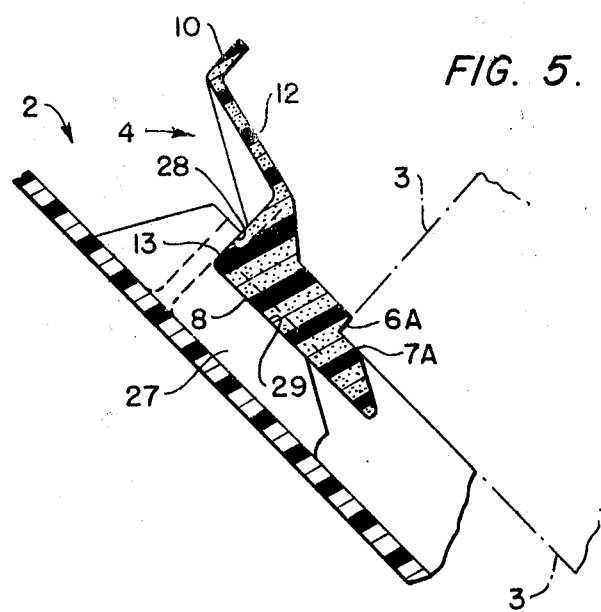

The electric motor includes a stator assembly with a conventional laminated stator stack 3 carrying field coils (not shown). The stack 3 is of generally cylindrical form and at its ends are mounted in a first spacing member 4 and in a second spacing member 5 of a heat-resistant plastics material, for example glass-filled nylon. Each spacing member includes sectored radial flanges and sectored longitudinal collars which engage the laminated stack. In the case of the first spacing member 4, the sectored radial flange is 6A and the sectored longitudinal collar is 7A (FIGS. 5 and 11). In the case of the case of the second spacing member 5, the sectored radial flange is 6B and the sectored longitudinal collar is 7B (FIGS. 3 and 13).

The first spacing member 4 is shown in detail in FIGS. 5 through 11. First spacing member 4 consists of an outer ring shaped band 8 joined by, inter alia, radially and axially extending webs 9 to a central support plate 10 apertured at 11.

The central plate 10 is also supported by four radially and axially extending arms 12 each of which has a radially extending plateau 13 which is supported from the motor housing 2, as will be described below. Beneath the respective plateaus 13, each arm 12 has an axially extending pair of spaced prongs 14. The prongs 14 are stepped to provide the radial flange 6A and the longitudinal collar 7A to receive and support the laminated stator stack 3.

Figure 6:
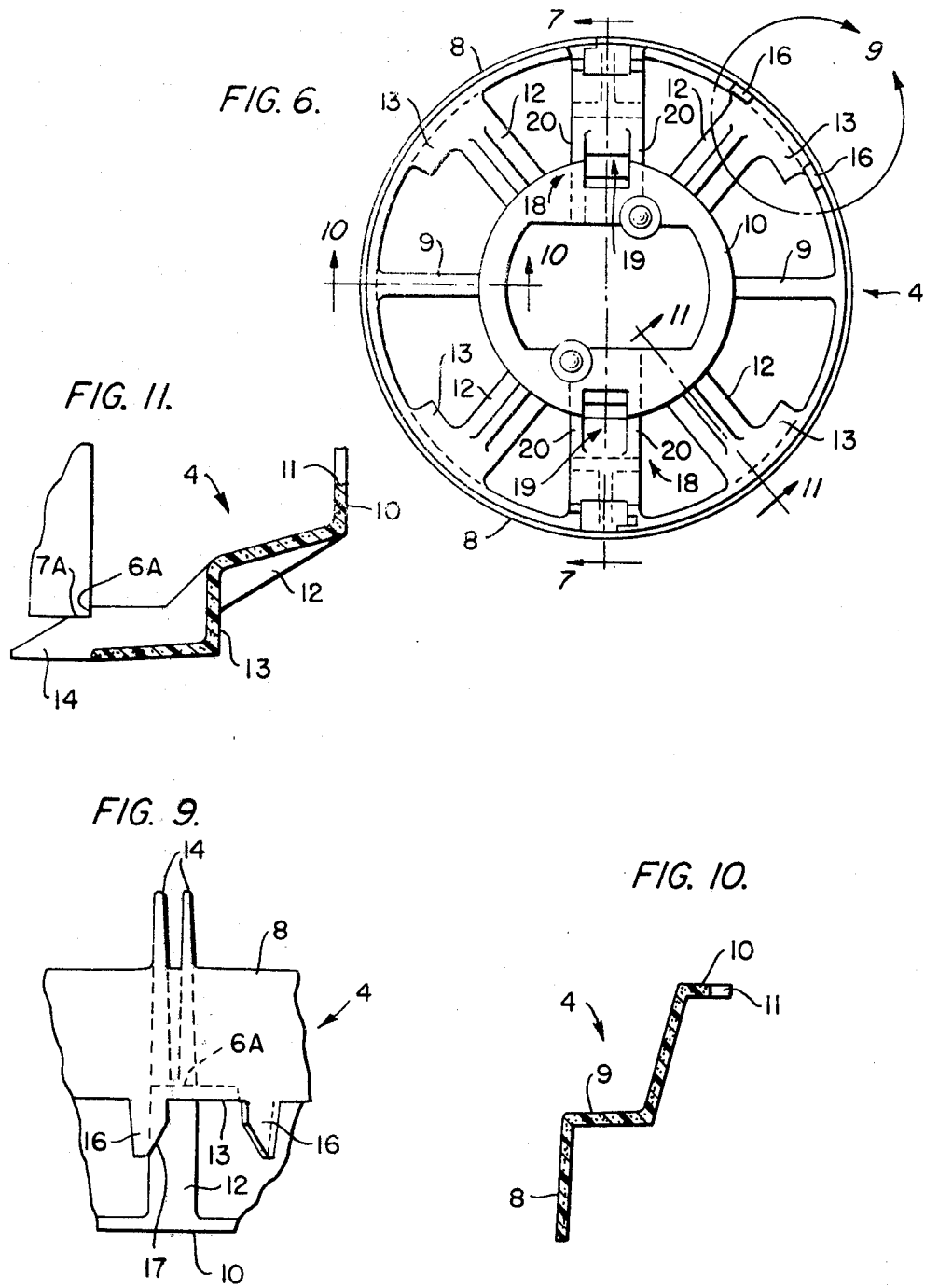
FIG. 6 is an end view of a first spacing member made of a heat resistant polymeric material and used at the commutator end of the electric motor taken from the left side of FIG. 7.

One of the arms 12, as shown in FIGS. 6 and 9, also has spaced prongs 16 extending axially towards the plate 10 from areas adjacent the peripheral edge of the plateau 13 of this particular arm. Each of the prongs 16 has an inclined face 17 as shown in FIG. 9. The prongs 16 act as location means to orientate the first spacing member 4 correctly with respect to the field casing as will be described below.

Figure 7:
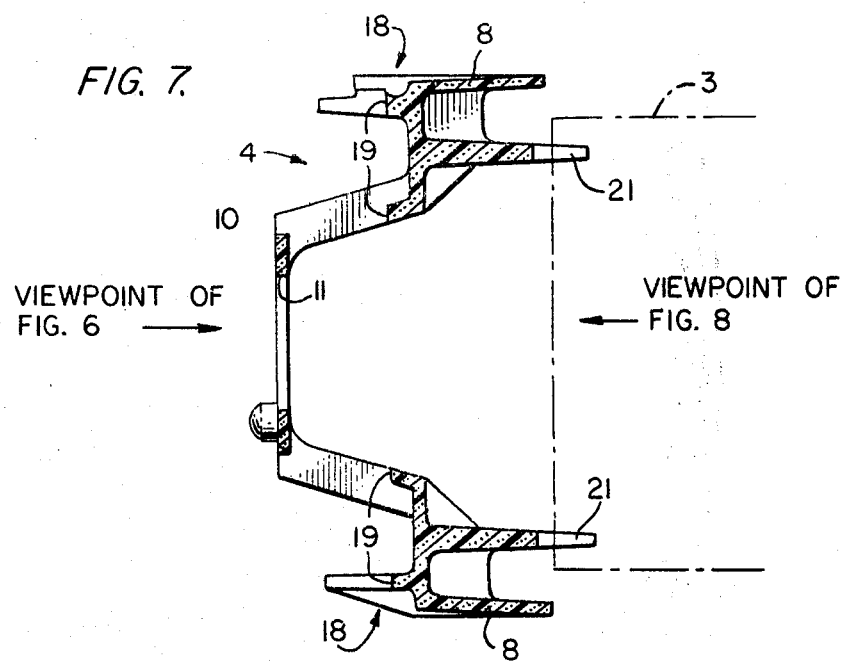
FIG. 7 is a section on the line 7—7 of FIG. 6.
Figure 8:
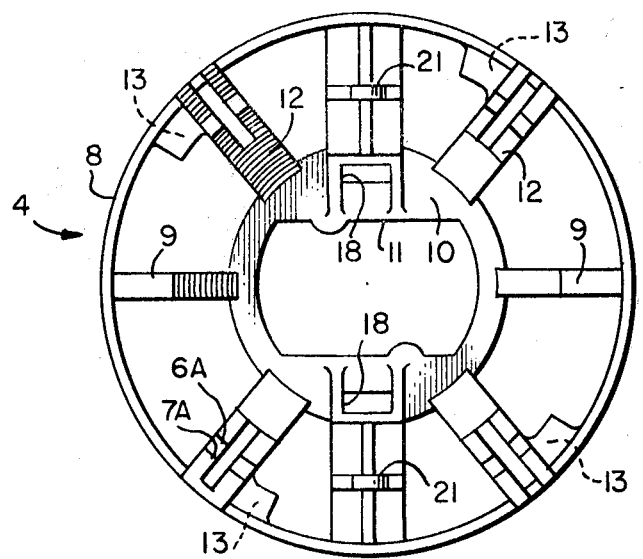

Also forming part of the first spacing member 4 are brush box support members 18 that extend from diametrically opposed positions on the ring member 8 to the support plate 10. Each member 18 has a brush box support face 19 that extends radially inwardly from member 8 and terminates between adjacent inclined support arms 20 whose inner ends merge into the plate 10. Extending to the right (as seen in FIG. 7) from the surface 19 are prongs 21 whose outer ends are bifurcated.

Strengthening webs are provided for the various parts of the first spacing member 4 as shown in the drawings.

Second spacing member 5, shown in more detail in FIGS. 12-15, is generally comparable in function to first spacing member 4, and therefore has some similarities in structure. It has a ring member 22 with an integral peripheral flange 23 of approximately square shape when seen in end view as in FIG. 12.

Equi-spaced round the flange 23 are arcuate sectored longitudinal collars 7B, joined to sectored radial flanges 6B. These sectored collars and flanges support the laminated stator stack 3, as shown in FIG. 13.

The four sectored radial flanges 6B and sectored longitudinal collars 7B are supported and tied together by ring member 22 to constitute a rigid support for the laminated stator stack 3.

Extending away from flange 23 on that side remote from the laminated stator stack 3 are four pegs 26 arranged at the corners of the flange 24 as can be seen from FIG. 12.

The interior surface of the motor housing 2 is contoured to provide guide surfaces that co-operate with the first and second spacing members 4 and 5 as will now be described.

Figure 1:
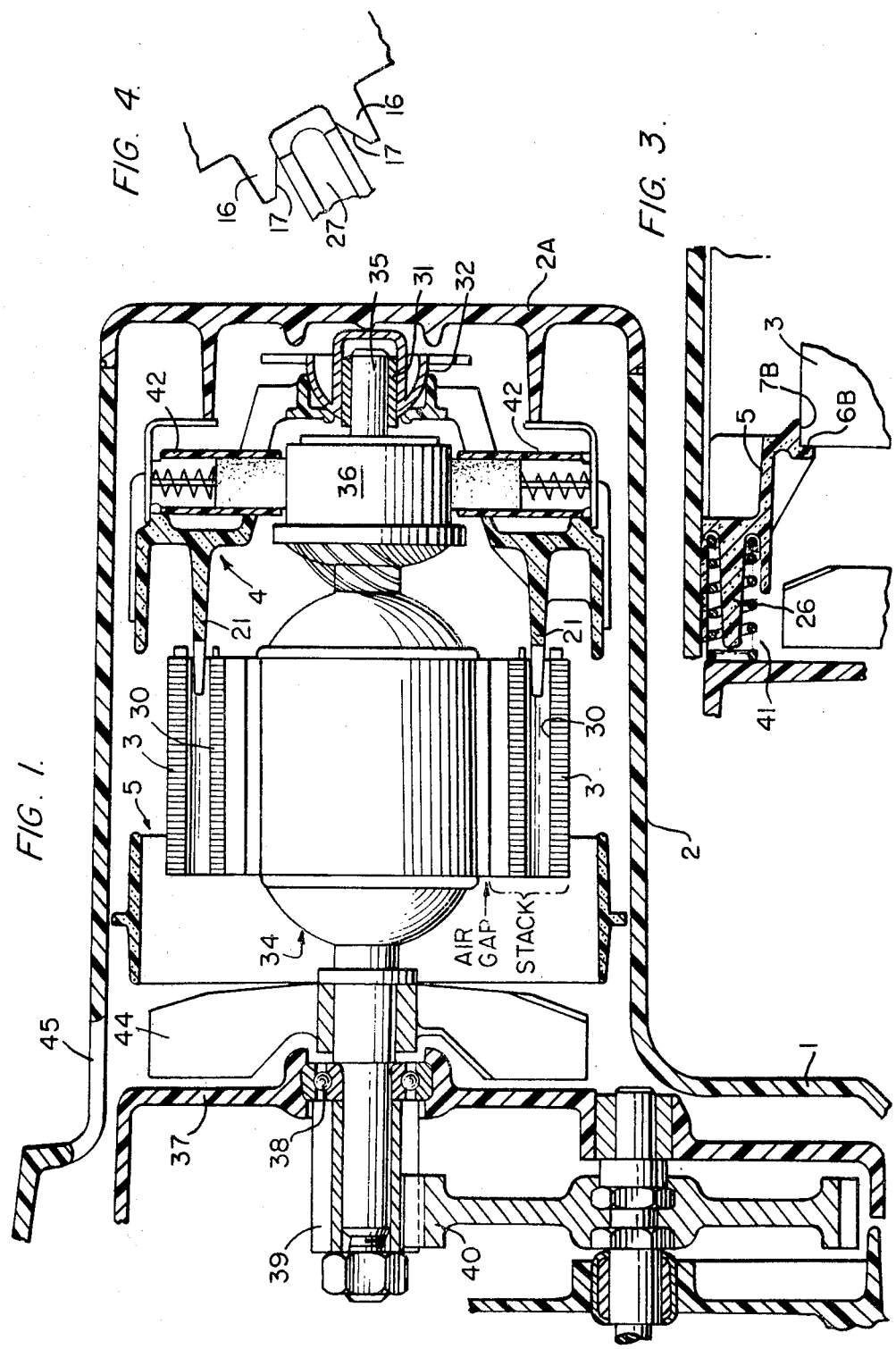
FIG. 1 is a section through an electric driving motor and part of the reduction gear of a chain saw.
Figure 2:
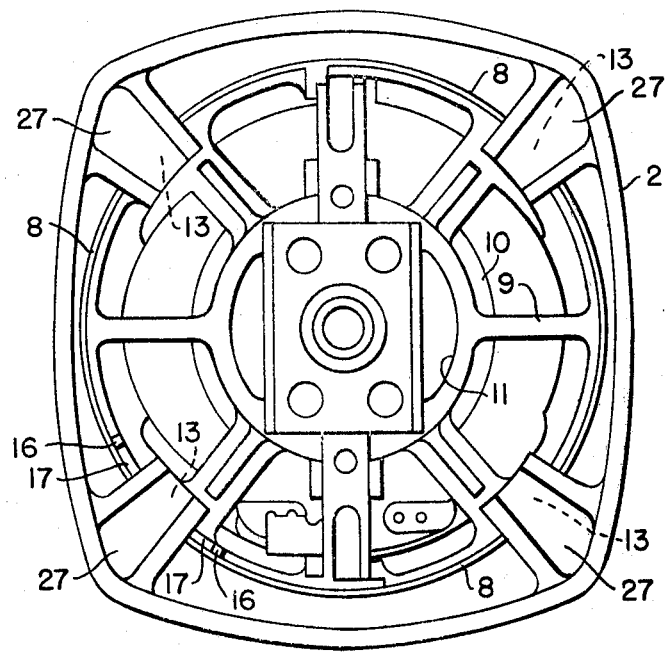
FIG. 2 is an end view of a part of the electric driving motor shown in FIG. 1 with the end cover removed, taken from the right end of FIG. 1.

As can be seen from FIG. 2, the motor housing 2 is of approximately square form when seen in cross section and extending from each corner adjacent the right-hand end of the casing as seen in FIG. 1, are location blocks 27 (FIGS. 2 and 5) contoured at 28 to co-act with the radial extending plateau 13 on the first spacing member 4 to locate the latter axially. The blocks have axial surfaces 29 that co-act with the ring shaped band 8 as shown in FIG. 5.

To hold spacer 4 against rotation, the prongs 16 locate as shown in FIG. 2 with the bottom left-hand location block 27—this feature is shown in the fragmentary view of FIG. 4 and in the assembled view of FIG. 2.

The second spacing member 5 fits over the other end of the laminated stator stack 3. The external edge of the flange 23 conforms in shape and size to the interior configuration of the field case at the left-hand end thereof as viewed in FIG. 1. Thus annulus 5 provides support only for this end of the stack 3 with respect to the field case.

To support the stack 3 at its right-hand end as seen in FIG. 1, the prongs 21 fit into axial holes 30 in the stack 3 and this provision also locates the stack in its correct orientation about its axis.

Before assembly, a bearing 31 is secured in a bearing support plate 32 and this assembly is fixed to the central support plate 10 of the first spacing member 4.

As can be seen from FIG. 1 and as has been explained above, the motor housing 2 is part of a much larger main housing 1, the motor housing 2 opening into this main housing and, in use, being closed at its other end by an end cover 2A removably secured to the motor housing.

The stator assembly including the first and second spacing members 4 and 5 is inserted into the field case from the left end, as seen in FIG. 1. The rotor assembly 34 is then inserted through the stator, the end of the rotor shaft 35 adjacent the commutator 36 engaging the bearing 31. A bearing plate 37 supporting a bearing 38 is then passed over the other end of the rotor shaft 35 (the left end in FIG. 1) to support that end. The bearing plate 37 is secured to the main housing 1 in a manner not shown in the drawings.

To the outer end of the shaft 35 is secured a drive pinion 39 which meshes with a gear wheel 40 for transmitting to the saw chain (not shown) of the chain saw. Other components and safety devices conventionally fitted to chain saws are not described or shown.

To hold the laminated stator stack 3 and the first and second spacing member 4 and 5 firmly in place, helical springs 41 round the pegs 26 are compressed as the bearing plate 37 is secured in place.

After brush boxes 42 containing brushes 43 have been placed in position on the surfaces 19 and between the arms 20, and the appropriate electrical connections completed, the end cap 2A is fixed in place.

The exploded view of FIG. 16 indicates how the various components are fitted together during assembly, as just described. The motor housing 2 is shown in phantom lines, without the attached main housing 1, which would join the near side of motor housing 2, as seen in FIG. 16. The laminated stator stack 3 with the first and second spacing numbers 4 and 5 stuck onto the stack are first slid into the nearby open end of motor housing 2, followed by the rotor assembly 34 on its shaft 3, as above described. Alternatively, the completely assembled motor, including bearing 31, bearing plate 32 can be slid into place. In the case, the brushes 43 and brush boxes could also have been included in the subassembly, instead of being installed through the open far end of motor housing, as seen in FIG. 16.

As is usual with small electric motors, the field coils normally extend from the ends of the field stack and such extensions radiate heat. To limit the effect of such radiated heat on the motor housing 2, the ring member 22 is made continuous so as to act as a heat shield. At the other end of the stack, the outer ring shaped band 8 serves a similar purpose.

Cooling of the motor is effected in conventional manner by a cooling fan 44 mounted upon the armature shaft 35; it draws air through inlet apertures in the field case adjacent the end cap 2A and/or in the end cap itself, such air being expelled through outlet holes 45 in the field casing. Recirculation of air in the vicinity of the fan is prevented by ring member 22 of the second spacing member 5.

It will be appreciated that cooling air flows over the exterior of the stack 3 because of the use of the first and second spacing members 4 and 5 and the spaced stack mounting points thereon. This helps keep the motor cool and reduces the transmission of heat to the field case.

It will be appreciated that the first and second spacing members 4 and 5 described above are one piece moldings of glass filled nylon or other suitable heat resisting material. Alternatively, the spacing members may be of two- or more part form.

The motor housing 2 is made of a plastic material less able to withstand heat than the material from which the first and second spacing members 4 and 5 are made. A suitable material is ABS. In general this is cheaper than the material from which the first and second spacing members are made. The motor housing 2 is sufficiently robust to provide the necessary mechanical support for the stator 3 and, of course, the motor housing 2, being of an electrically-insulating material, also insulates the motor.

It will be understood that the use of the first and second support members as herein disclosed is of general utility in the electric motors of hand-held power tools other than chain saws.

I claim:

1. A portable electric tool comprising:
   a housing made of a first plastics material;
   a motor mounted in the housing and having a stator assembly;
   two members made of a second plastics material mutually spaced apart within the housing and supporting the stator assembly therebetween; and
   the second plastics material being of a kind capable of withstanding the full motor working temperature.

2. A portable electric power tool, comprising:
   an electric motor to drive said tool, said electric motor emitting heat in operation and thereby attaining an elevated running temperature;
   a polymeric housing encasing said electric motor, said polymeric housing supporting said electric motor mounted therewithin;
   the material of said polymeric housing inherently becoming softened if subjected to said elevated running temperature;
   said electric motor being supported within said polymeric housing by spacing members axially spaced apart and extending between the said electric motor and said polymeric housing;
   said spacing members being made of a polymeric material which is inherently resistant to said elevated running temperature; and
   said spacing members being of low thermal conductivity to hinder conduction of heat from said electric motor to said polymeric housing.

3. The portable electric tool recited in claim 2, wherein said spacing members are the sole support of at least a portion of said electric motor within said motor housing.

4. The portable electric tool recited in claim 2, wherein said spacing members comprise portions which act as thermal shields;
   thereby reducing thermal radiation from said electric motor to said motor housing.

5. The portable electric tool recited in claim 2, wherein said spacing members comprise ventilating air flow directing portions;
   whereby said spacing members assist in promoting cooling of said electric motor.

6. The portable electric tool recited in claim 2, wherein said spacing members and said motor housing are so configured that a major subassembly of said electric motor and said spacing members can be slid endwise, in a direction along the axis of said electric motor, into tight supporting engagement with the inside of said motor housing.

7. The portable electric tool recited in claim 2, wherein one of said spacing members includes brush holder means.

8. The portable electric tool recited in claim 2, wherein one of said spacing members includes means to support a bearing for said electric motor.

9. A portable electric tool, comprising:
   an electric motor to drive the tool, said motor having a stator stack;
   a housing encasing said tool and being made of a plastics material unable to withstand the running temperature of said motor;
   two axially spaced apart spacing members, each comprising a ring-shaped band, and supporting therebetween said stator stack in said housing in spaced relationship therefrom, said spacing members engaging opposite ends of said stator stack and extending axially away therefrom; and
   said spacing members being made of a heat resistant plastics material able to withstand the motor running temperature.

10. The portable electric tool recited in claim 9, wherein said motor has a commutator and brush holder means, and one of said spacing members has a structure surrounding said commutator and housing said brush holder means.

11. The portable electric tool recited in claim 10, wherein said structure also houses a bearing of said motor.

* * * * *